United States Patent
Bartholomeyczik et al.

(10) Patent No.: US 8,543,852 B2
(45) Date of Patent: Sep. 24, 2013

(54) METHOD AND SYSTEM FOR DETERMINING AN IDLE STATE

(75) Inventors: Julian Bartholomeyczik, Reutlingen (DE); Sergej Scheiermann, Eningen (DE)

(73) Assignee: Robert Bosch GmbH, Stuttgart (DE)

( * ) Notice: Subject to any disclaimer, the term of this patent is extended or adjusted under 35 U.S.C. 154(b) by 176 days.

(21) Appl. No.: 13/105,113

(22) Filed: May 11, 2011

(65) Prior Publication Data

US 2011/0283126 A1 Nov. 17, 2011

(30) Foreign Application Priority Data

May 11, 2010 (DE) .......................... 10 2010 028 828

(51) Int. Cl.
*G06F 1/00* (2006.01)
*G06F 1/26* (2006.01)
*G06F 1/32* (2006.01)

(52) U.S. Cl.
USPC .......................................... 713/320; 713/300

(58) Field of Classification Search
USPC .................................. 713/300, 320
See application file for complete search history.

(56) References Cited

U.S. PATENT DOCUMENTS

| 7,216,053 | B2* | 5/2007 | Rakkola et al. ............... 702/141 |
| 2007/0107068 | A1* | 5/2007 | Kelley et al. .................... 726/34 |
| 2007/0205982 | A1 | 9/2007 | Ishidera et al. |
| 2009/0259424 | A1 | 10/2009 | Dutta et al. |
| 2009/0293615 | A1 | 12/2009 | Lee |
| 2011/0239026 | A1* | 9/2011 | Kulik ............................ 713/324 |
| 2011/0277532 | A1* | 11/2011 | Bartholomeyczik et al. .. 73/1.38 |

FOREIGN PATENT DOCUMENTS

WO WO 2004/041086 5/2004

* cited by examiner

*Primary Examiner* — Mark Connolly
(74) *Attorney, Agent, or Firm* — Kenyon & Kenyon LLP

(57) ABSTRACT

In a method for determining an idle state: acceleration values are ascertained as a function of three spatial directions; a comparison value is generated from the acceleration values for each of the three spatial directions; each of the comparison values is compared with a threshold value; an interrupt signal is generated if the comparison value is less than the threshold value for each of the three spatial directions; and an electronic component is switched from a power saving state to an operating state as a function of the interrupt signal.

14 Claims, 1 Drawing Sheet

METHOD AND SYSTEM FOR DETERMINING AN IDLE STATE

CROSS-REFERENCE TO RELATED APPLICATIONS

The present application claims priority to Application No. 10 2010 028 828.4, filed in the Federal Republic of Germany on May 11, 2010, which is expressly incorporated herein in its entirety by reference thereto.

FIELD OF THE INVENTION

The present invention relates to a method and system for determining an idle state.

BACKGROUND INFORMATION

Methods of this type are generally known. For example, a method for detecting a change in position with the aid of an acceleration sensor is described in U.S. Pat. No. 7,216,053. The acceleration sensor is used to ascertain individual direction components of a detected acceleration along the three different spatial directions and to calculate an average acceleration value for each direction component. The average acceleration value is then compared with a corresponding threshold value for each spatial direction and, if a threshold value is exceeded, an interrupt signal is generated which is provided for "waking up" a processor from a power saving mode. This method is used, for example, to reduce the power consumption of portable mobile devices which have an automatic position detection function. In this case, power is saved by the fact that the device processor does not carry out a precise automatic position detection or a check of whether the device has changed position, but instead that it is placed in a power saving mode and is woken up from the power saving mode with the aid of the interrupt signal only if an actual change in position or a sudden movement has taken place. While the processor is in power saving mode, the position check is carried out by a comparatively simple and energy-efficient circuit.

A disadvantage of this method is that only changes in state in which the device is suddenly placed in motion from an idle state are detectable for waking up the processor. Waking up the processor for the purpose of precise measurement of an idle state or a "1g" state, on the other hand, is not provided.

SUMMARY

The method according to example embodiments of the present invention and the system according to example embodiments of the present invention for determining an idle state have the advantage over conventional methods and systems in that the presence of an idle state is detectable in a comparatively easy, power saving and efficient manner, making it possible to wake up the electronic components from the power saving mode and place them in the operating mode as soon as the idle state occurs. In other words, the electronic component is advantageously switched from the power saving mode to the operating state as soon as an idle state has occurred, and conversely the electronic component preferably remains in the power saving mode as long as no idle state occurs. An idle state (also referred to herein as the "1g" state) is in the present context, in particular, a state in which substantially only the force of gravity ("1g" acceleration, "g" representing the gravitational acceleration) acts as the acceleration force, and no free fall occurs. Detecting an idle state of this type is particularly advantageous, for example for the following methods: calibrating acceleration sensors in portable mobile devices; detecting the orientation of a portable mobile device relative to the earth's gravitational field; compensating for a "compass tilt" (tilting of the compass plane relative to the earth's surface) to detect the orientation of a portable mobile device relative to the gravitational field and thus also relative to the earth's magnetic field. These methods may be carried out only in the idle state and, in particular, not during the presence of other dominating acceleration forces (since the accuracy of measurements of this type, is too poor in this case). In cases in which no idle state occurs, these methods are thus not carried out, and the corresponding electronic component is instead placed in the power saving mode to save power. The electronic component includes, in particular, a microprocessor. The evaluation unit is preferably integrated into the sensor logic of the acceleration sensor unit on the basis of hardware and/or software.

According to example embodiments, it is provided that, in the second method step, both a maximum value and a minimum value in the particular acceleration values are determined over a time interval for each of the three spatial directions, the comparison value being determined in each case as the difference between the particular minimum value and the particular maximum value of the corresponding spatial direction for each of the three spatial directions. The comparison value may be particularly easily determined in this manner, and it is a reliable measure for determining the dynamics along the particular spatial direction. A functionality of this type may be implemented, in particular, comparatively easily and energy efficiently in hardware and/or software without requiring much installation space. In particular, it is preferably provided that the acceleration values for each spatial direction, i.e., in particular for an X, Y and Z spatial direction, are stored in a separate FIFO memory (first in, first out memory), i.e., a plurality of X motion values is stored in an X FIFO memory, a plurality of Y motion values is stored in a Y FIFO memory and a plurality of Z motion values is stored in a Z FIFO memory. In each FIFO memory, a maximum value and a minimum value are subsequently determined, and the particular difference value between this maximum value and minimum value is then determined for each of the three spatial directions X, Y and Z such that an X comparison value, a Y comparison value and a Z comparison value are generated. These three comparison values are subsequently compared individually with a combined threshold value or, as an alternative, with a separate threshold value for each spatial direction.

According to example embodiments, it is provided that, in a fifth method step, a cumulative value is calculated as the sum of a particular acceleration value for each of the three spatial directions, the cumulative value being compared with a further threshold value in a sixth method step, the interrupt signal being generated in the fourth method step if the comparison value is less than the threshold value for each of the three spatial directions in the third method step, and if the cumulative value is greater than the further threshold value in the sixth method step. The cumulative value is calculated, in particular, as an absolute value sum from the particular acceleration values. Only reduced acceleration forces are active in the free fall state, so that the idle state is indistinguishable from the free fall state solely with the aid of the third method step. Based on the sixth method step, the idle state is then advantageously distinguishable from the free fall state, since the absolute value sum of the particular acceleration values is lower in the free fall state than in the idle state, so that it is possible to make a distinction by suitably selecting the further threshold value.

According to example embodiments, it is provided that an average acceleration value is formed from the particular acceleration values for each of the three spatial directions in the fifth method step, the cumulative value being calculated for each of the three spatial directions as the sum of the particular average acceleration values. The reliability and accuracy in distinguishing the idle state from the free fall state are thus advantageously increased in an easy manner.

According to example embodiments, it is provided that each of the three spatial directions is assigned a single threshold value, the comparison value of one of the three spatial directions being compared only with the threshold value assigned to this spatial direction in the third method step. In this manner, it is advantageously possible that special geometric characteristics of the portable mobile device are taken into account when detecting the idle state. It is possible, for example, that in such a device, which has a priority orientation (for example, an electronic compass which is to be held largely parallel to the earth's surface), only the threshold value which forms the upper limit for the comparison value, based on acceleration values parallel to the gravitational field (along the Z spatial direction), lies particularly close to the 1g value and, in particular, preferably amounts to a maximum of 130 percent of the 1g value, particularly preferably a maximum of 120 percent of the 1g value, and very particularly preferably a maximum of 110 percent of the 1g value. The threshold values for the X and Y spatial directions are preferably less than the g value. According to example embodiments, it is provided that the second to sixth method steps are preferably carried out by a microcontroller and/or an ASIC. The power demand of a microcontroller and/or a suitably designed ASIC (Application-Specific Integrated Circuit) is advantageously much less than that of the electronic component or the (main) processor which is provided to carry out much more accurate position and orientation determination measurements.

According to example embodiments of the present invention, a system for determining an idle state includes an acceleration sensor unit, an evaluation unit and an electronic component, the acceleration sensor unit being configured to ascertain acceleration values along three spatial directions, the evaluation unit being configured to generate one comparison value from the acceleration values for each of the three spatial directions and to compare each of the comparison values with a threshold value, the evaluation unit being configured to generate an interrupt signal if the comparison value is less than the threshold value for each of the three spatial directions in the third method step, and the electronic component being configured to change its operating mode from a power saving state to an operating state as a function of the interrupt signal. As illustrated in detail above, an idle state of the system is detectable in this manner such that the electronic component or the (main) processor is woken up from the power saving mode in the presence of the idle state. In contrast to conventional arrangements, the electronic component or the (main) processor is not activated upon detection of a sudden state of motion, but conversely is activated only upon detection of the idle state. This provides a comparatively energy-efficient operation of the system in applications in which a precise determination of position or orientation by the electronic component or by the (main) processor is to take place exclusively in the idle state.

According to example embodiments, it is provided that the evaluation unit is configured to determine both a maximum value and a minimum value in the particular acceleration values for each of the three spatial directions, the evaluation unit being configured to determine the comparison value as a difference between the particular minimum value and the particular maximum value for each of the three spatial directions. The difference between the maximum value and the minimum value is a comparatively easy-to-determine, efficient and reliable measure for determining the dynamics of the system for the particular spatial direction.

According to example embodiments, it is provided that the evaluation unit is configured to calculate a cumulative value as the sum of one acceleration value or one average acceleration value for each of the three spatial directions and to compare the cumulative value with a further threshold value, the evaluation unit being configured to generate the interrupt signal if the comparison value is less than the particular threshold value for each of the three spatial directions and if the cumulative value is greater than the further threshold value. A distinction may thus be advantageously made between the idle state and the free fall.

According to example embodiments, it is provided that the evaluation unit includes three FIFO memories, the acceleration values of one of the three spatial directions each being stored in one of the three FIFO memories, and/or the acceleration sensor unit including a single three-channel, in particular micromechanical, acceleration sensor or three one-channel, in particular micromechanical, acceleration sensors, and/or the evaluation unit including a microcontroller and/or an ASIC, and/or the electronic component including a (main) processor. A comparatively energy-efficient, cost-effective and compact structure of the system is thus advantageously provided, since the microcontroller or suitably designed ASICs have comparatively little power and space requirements compared to (main) processors. The micromechanical acceleration sensor preferably includes a seismic mass which is movably suspended relative to a substrate and whose deflections relative to the substrate as a result of inertial forces produced by outer acceleration forces are measured (for example, with the aid of a finger electrode and/or capacitor plate system).

Exemplary embodiments of the present invention are illustrated in the drawings and explained in greater detail in the following description.

DETAILED DESCRIPTION

Figure 1:
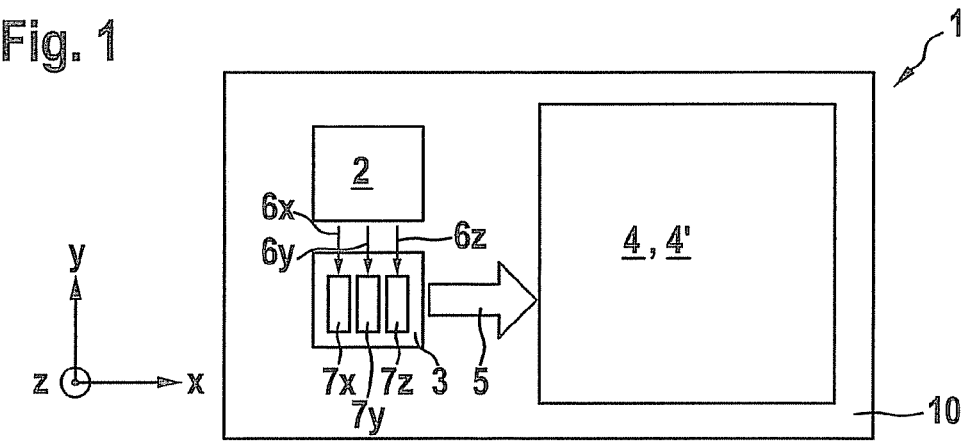
FIG. 1 shows a schematic view of a system according to an example embodiment of the present invention.

FIG. 1 shows a schematic view of a system 1 for determining an idle state according to an example embodiment of the present invention, system 1 including a portable mobile device 10, for example a mobile telephone. Portable mobile device 10 has at least one acceleration sensor 2, an evaluation unit 3, and an electronic component 4 in the form of a main processor 4'. Among other things, main processor 4' takes position and orientation measurements to detect the spatial position of portable mobile device 10. For example, the gravitational acceleration, i.e., the so-called g vector, is detected with the aid of a 3-axis acceleration sensor. When portable mobile device 10 is exposed to strong motions, however, accelerations which are produced by the strong motions are superimposed upon the gravitational acceleration, so that it is not possible to detect the position by measuring the gravitational acceleration. To avoid such measuring operations in motion states in which a measurement would only mean unnecessary power consumption (since no useable results are achievable), the position and orientation measurement of main processor 4' is carried out only in idle states of system 1 in which a determination of the gravitational acceleration is indeed possible. Outside the idle state, main processor 4' is placed in a power saving state, at least where the position and orientation measurement is concerned. Main processor 4' is woken up from the power saving mode and placed in an operating mode with the aid of an interrupt signal 5 only when evaluation unit 3 detects an idle state. In the present context, an idle state (also referred to as the "1g" state) is, in particular, a state in which substantially only the force of gravity ("1g" acceleration, "g" representing the gravitational acceleration) acts upon system 1 as the acceleration force, and furthermore no free fall occurs. Acceleration sensor unit 2 includes a 3-channel micromechanical acceleration sensor which is sensitive to each of the three spatial directions X, Y, Z. The accelerations measured along each of three spatial directions X, Y, Z are transmitted to evaluation unit 3 in the form of acceleration values $6_X$, $6_Y$, $6_Z$ and are sorted according to particular spatial direction X, Y, Z. Evaluation unit 3 has three FIFO memories $7_X$, $7_Y$, $7_Z$ (first in, first out memories), acceleration values $6_X$, $6_Y$, $6_Z$ of one of three spatial directions X, Y, Z being stored in each FIFO memory $7_X$, $7_Y$, $7_Z$. Evaluation unit 3 subsequently executes an algorithm based on acceleration values $6_X$, $6_Y$, $6_Z$ to identify a possible idle state of system 1 and, if necessary, to generate interrupt signal 5 for waking up main processor 4'. The algorithm is hardware-implemented, for example on an ASIC or microcontroller, and/or software-implemented, for example on a computer chip, in system 1 or evaluation unit 3. The power consumption of evaluation unit 3 is, in particular, much lower than the power consumption of main processor 4'. The mode of operation of the algorithm is described in detail below on the basis of FIG. 2.

Figure 2:
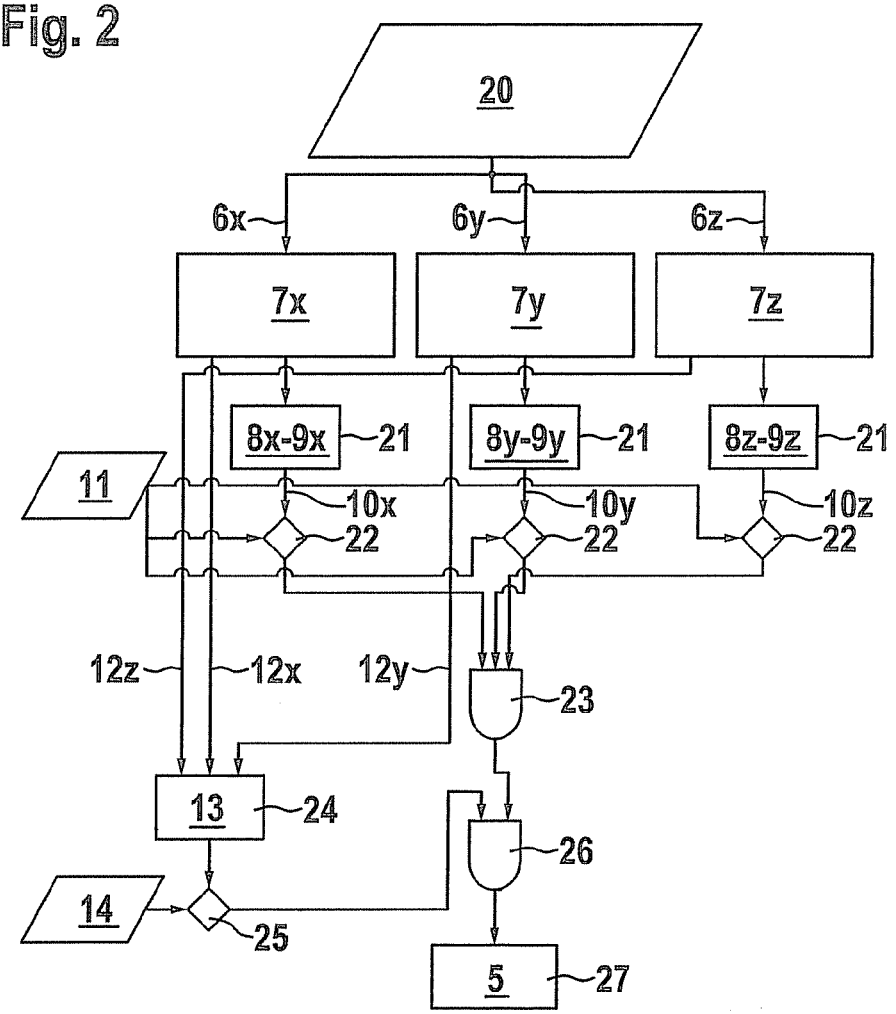
FIG. 2 shows a schematic view of a method according to an example embodiment of the present invention.

FIG. 2 shows a schematic flow chart of a method for determining an idle state according to an example embodiment of the present invention, this method being carried out, in particular, in a system 1 illustrated on the basis of FIG. 1. In a first method step 20, acceleration values $6_X$, $6_Y$, $6_Z$ are generated which are a measure of accelerations of system 1 along three spatial directions X, Y, Z. They are ascertained, in particular, with the aid of acceleration sensor unit 2. These acceleration values $6_X$, $6_Y$, $6_Z$ are sorted according to particular spatial direction X, Y, Z and stored in one of three FIFO memories $7_X$, $7_Y$, $7_Z$ of evaluation unit 3. In a second method step 21, both maximum value $8_X$, $8_Y$, $8_Z$ and minimum value $9_X$, $9_Y$, $9_Z$ are subsequently ascertained for each of three spatial directions X, Y, Z in each of FIFO memories $7_X$, $7_Y$, $7_Z$, and a comparison value $10_X$, $10_Y$, $10_Z$ is then determined for each of three spatial directions X, Y, Z, the comparison value being calculated from the mathematical difference between particular maximum value $8_X$, $8_Y$, $8_Z$ and particular minimum value $9_X$, $9_Y$, $9_Z$ of corresponding spatial direction X, Y, Z. In a subsequent third method step 22, three comparison values $10_X$, $10_Y$, $10_Z$ are each compared with a threshold value 11 (in this case, it is possible to generate interrupt signal 5 even if each of the three comparison values $10_X$, $10_Y$, $10_Z$ lies below threshold value 11, and electronic component 4 or main processor 4' is switched from the power saving mode to the operating mode). In a subsequent intermediate step 23, a check of whether each of the three comparison values $10_X$, $10_Y$, $10_Z$ lies below threshold value 11 is carried out on the basis of a logical AND gate. At the same time, for each FIFO memory $7_X$, $7_Y$, $7_Z$, an average acceleration value $12_X$, $12_Y$, $12_Z$ is first calculated from particular acceleration values $6_X$, $6_Y$, $6_Z$ for each of three spatial directions X, Y, Z, and the absolute value sum 13 is then calculated from three average acceleration values $12_X$, $12_Y$, $12_Z$ in a fifth method step 24 ($|12_X|+|12_Y|+|12_Z|$). Alternatively, it is also possible to calculate absolute value sum 13 directly from one single acceleration value $6_X$, $6_Y$, $6_Z$ for each spatial direction X, Y, Z, i.e., without forming the average value ($|6'_X|+|6'_Y|+|6'_Z|$); in this case, for example, last acceleration value $6_X$, $6_Y$, $6_Z$, in particular FIFO memory $7_X$, $7_Y$, $7_Z$, is always used. Next, a check of whether a further threshold value 14 is exceeded by absolute value sum 13 is carried out in a sixth method step 25. In a subsequent further intermediate step 26, a check is carried out as to whether both further threshold values 14 are exceeded by absolute value sum 13 and whether each of the three comparison values $10_X$, $10_Y$, $10_Z$ lies below threshold value 11, with the aid of a further logic AND gate. Only if both conditions have been met is interrupt signal 5 generated in a fourth method step 27, and electronic component 4 or main processor 4' is woken up from the power saving state and placed in the operating state. The two mathematical conditions ensure that, on the one hand, the idle state is distinguished from the free fall (sixth method step 25) and, on the other hand, the maximum permitted dynamics of system 1 are limited in the idle state for individual spatial directions X, Y, X (third method step 22).

What is claimed is:

1. A method for determining an idle state, comprising:
   ascertaining acceleration values as a function of three spatial directions;
   generating a comparison value from the acceleration values for each of the three spatial directions;
   comparing each of the comparison values with a threshold value;
   generating an interrupt signal if the comparison value is less than the threshold value for each of the three spatial directions; and
   switching at least one electronic component from a power saving state to an operating state as a function of the interrupt signal.

2. The method according to claim 1, wherein both a maximum value and a minimum value are determined in the particular acceleration values for each of the three spatial directions, each comparison value being determined for each of the three spatial directions as a difference between the particular minimum value and the particular maximum value of the corresponding spatial direction.

3. The method according to claim 1, further comprising:
   calculating a cumulative value as a sum of one particular acceleration value for each of the three spatial directions;
   comparing the cumulative value with a further threshold value; and
   generating the interrupt signal if the comparison value is less than the threshold value for each of the three spatial directions and if the cumulative value is greater than the further threshold value.

4. The method according to claim 3, wherein an average acceleration value is formed from the particular acceleration values for each of the three spatial directions, the cumulative value being calculated as a sum of the particular average acceleration values for each of the three spatial directions.

5. The method according to claim 1, wherein each of the three spatial directions is assigned a single threshold value, the particular comparison value of one of the three spatial directions being compared only with the threshold value assigned to the spatial direction.

6. The method according to claim 1, wherein method is at least partially performed by at least one of (a) a microcontroller and (b) an ASIC.

7. A system for determining an idle state, comprising:
an acceleration sensor unit;
an evaluation unit; and
an electronic component;
wherein the acceleration unit is adapted to ascertain acceleration values along three spatial directions, the evaluation unit is adapted to generate a comparison value from the acceleration values for each of the three spatial directions and to compare each of the comparison values with a threshold value; and
wherein the evaluation unit is adapted to generate an interrupt signal if the comparison value is less than the threshold value for each of the three spatial directions, and the electronic component is adapted to change its operating mode from a power saving state to an operating state as a function of the interrupt signal.

8. The system according to claim 7, wherein the evaluation unit is adapted to determine both a maximum value and a minimum value in the particular acceleration values for each of the three spatial directions, the evaluation unit is adapted to determine the comparison value as a difference between the particular maximum value and the particular minimum value for each of the three spatial directions.

9. The system according to claim 7, wherein the evaluation unit is adapted to calculate a cumulative value as a sum of one acceleration value or one average acceleration value for each of the three spatial directions and to compare the cumulative value with a further threshold value, the evaluation unit is adapted to generate the interrupt signal if the comparison value is less than the threshold value for each of the spatial directions and if the threshold value is greater than the further threshold value.

10. The system according to claim 7, wherein the evaluation unit includes three FIFO memories, the acceleration values of one of the three spatial directions each being stored in one of the three FIFO memories.

11. The system according to claim 7, wherein the acceleration sensor unit includes an individual three-channel micromechanical acceleration sensor.

12. The system according to claim 7, wherein the accelerator sensor unit includes three one-channel micromechanical acceleration sensors.

13. The system according to claim 7, wherein the evaluation unit includes at least one of (a) a microcontroller and (b) an ASIC.

14. The system according to claim 7, wherein the electronic component includes a processor.

* * * * *